H. R. FRENCH.
EXTENSION-TABLE SLIDE.

No. 172,413. Patented Jan. 18, 1876.

UNITED STATES PATENT OFFICE.

HEMAN R. FRENCH, OF WEST RANDOLPH, VERMONT.

IMPROVEMENT IN EXTENSION-TABLE SLIDES.

Specification forming part of Letters Patent No. 172,413, dated January 18, 1876; application filed November 8, 1873.

*To all whom it may concern:*

Be it known that I, HEMAN R. FRENCH, of West Randolph, in the county of Orange and State of Vermont, have invented a new and valuable Improvement in Extension-Table Slides; and I do hereby declare that the following is a full, clear, and exact description of the construction and operation of the same, reference being had to the annexed drawings, making a part of this specification, and to the letters and figures of reference marked thereon.

Figure 1:
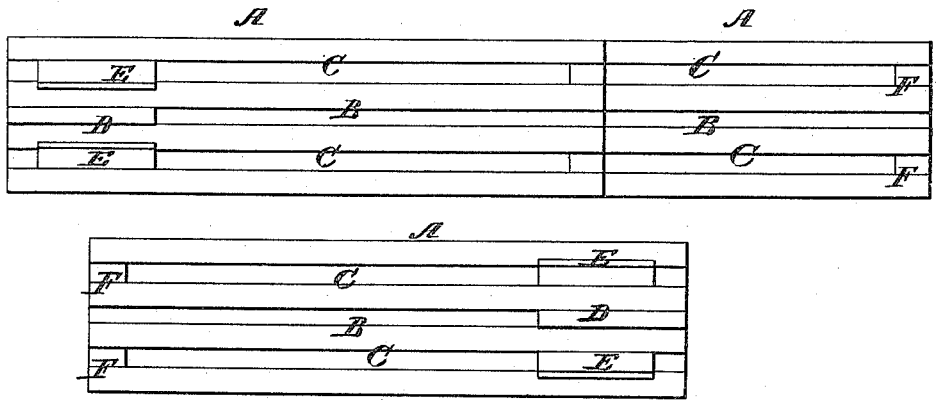
Figure 2:
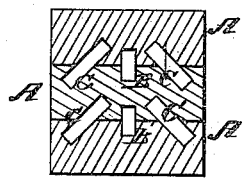
Figure 3:
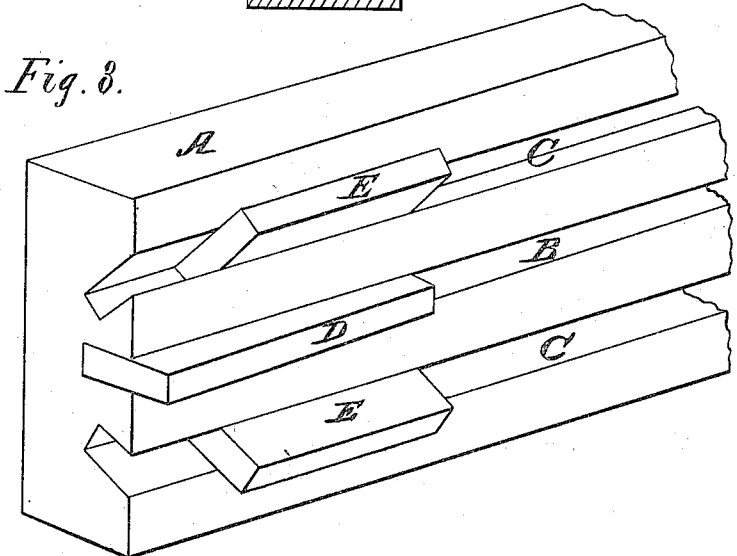

Figure 1 of the drawings is a representation of a plan view of my extension-table slide. Fig. 2 is a sectional view of the same. Fig. 3 is a perspective detail of the same.

This invention has relation to sliding bars for extension-tables, wherein the bars are connected together by means of sliding tongues, fitted into grooves. The object of my invention and improvement is to facilitate the manufacture of such extension-bars, and at the same time to connect them together in a much stronger and better manner than hitherto, as will be hereinafter explained. The following is a description of my improvement:

The bars A, which are of wood, are worked out of good hard stuff the proper thickness and length, and then placed upon the table of a circular saw, and by means of such saw grooved longitudinally, as shown at B C C. The outside bars are grooved on one side only, but the intermediate bar is grooved on two sides. The grooves or kerfs C C are inclined in opposite directions, as shown in Figs. 2 and 3; but the intermediate groove B is parallel to the top and bottom edges of its bar. Into these grooves I secure, by means of glue, slides D E E and stops F F, which are made of some suitable hard wood. The intermediate slide D of each bar A is secured into its groove at the end of the bar, and may be of any desired length which will give stability to the bars when fully extended. The inclined slides which connect contiguous bars together are not quite as long as the intermediate slide, and do not extend as far as the end of their bar. The stops F F are inserted into the inclined grooves C C at the ends of their respective bars, but do not project beyond the grooved surfaces. These stops are equal in length to the distance between the outer ends of the slides E E and the corresponding ends of their respective bars A, so that the ends of the bars can be brought evenly together. The inclined slides or tongues E E connect together contiguous bars, but allow them to be moved endwise on each other, and the intermediate slides or tongues serve to sustain the weight put on the bars and relieve the connecting-slides. The projecting portions of the slides are slightly reduced so as to play freely in their grooves or kerfs, which prevents any contraction or expansion of the bars from causing the slides to work too tight. All the slides afford long and firm bearings and prevent any looseness of the bars; and as these slides are glued into their grooves, they prevent the outer portions of the bars from splitting when subjected to considerable strain and weight.

What I claim as new, and desire to secure by Letters Patent, is—

The saw-grooved bars A, having wooden tongues or slides E E inserted into inclined grooves C C, in combination with the long slides D and stops F, all arranged as shown and described.

In testimony that I claim the above I have hereunto subscribed my name in the presence of two witnesses.

HEMAN R. FRENCH.

Witnesses:
J. HUTCHINSON, Jr.,
W. E. LAMSON.